UNITED STATES PATENT OFFICE.

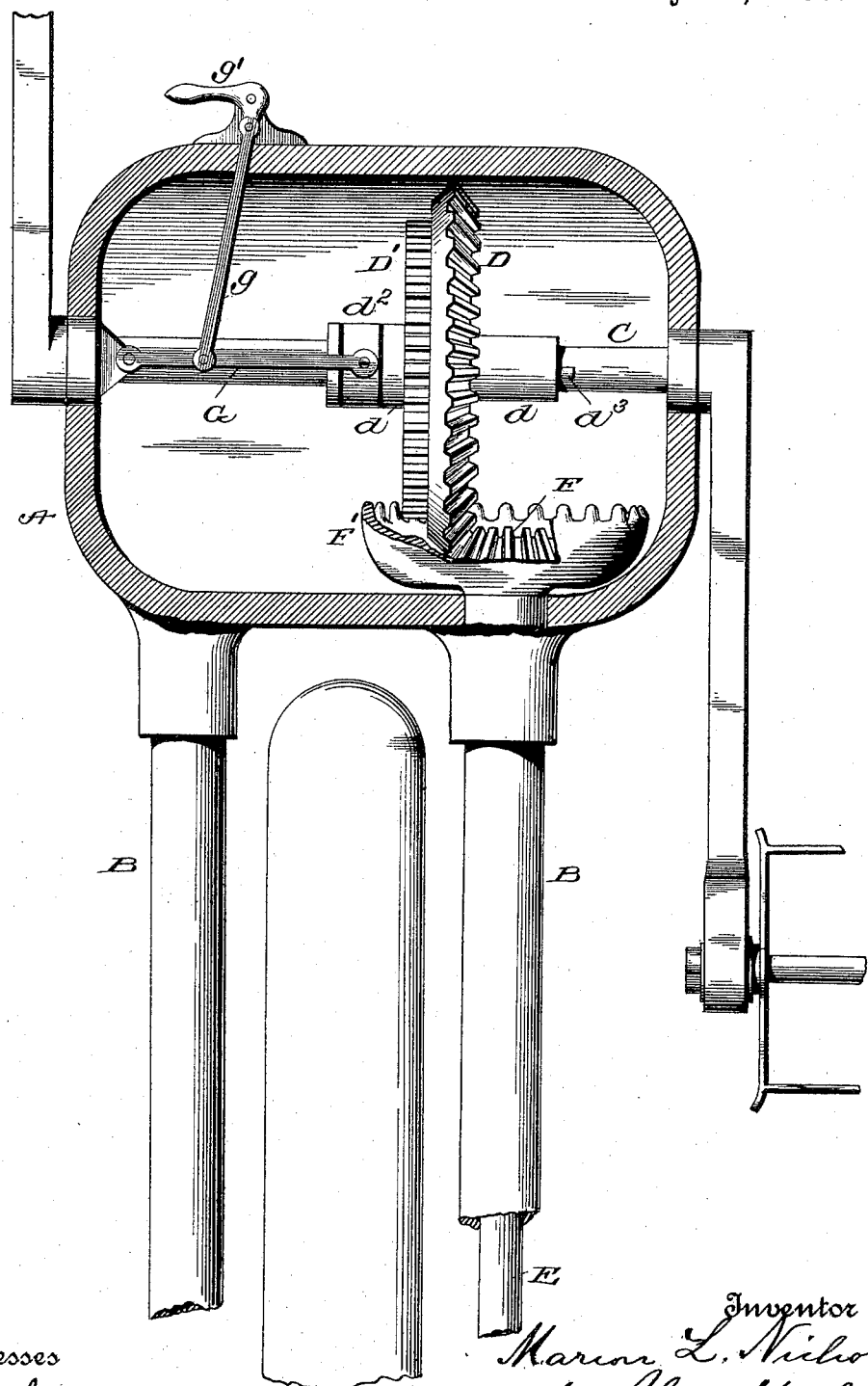

MARION L. NICHOLS, OF WESTFIELD, NEW JERSEY, ASSIGNOR, BY MESNE ASSIGNMENTS, TO THE POPE MANUFACTURING COMPANY, OF PORTLAND, MAINE, AND HARTFORD, CONNECTICUT.

BICYCLE-GEARING.

SPECIFICATION forming part of Letters Patent No. 586,141, dated July 13, 1897.

Application filed August 7, 1894. Renewed April 15, 1897. Serial No. 632,339. (No model.)

*To all whom it may concern:*

Be it known that I, MARION L. NICHOLS, of Westfield, county of Union, State of New Jersey, have invented new and useful Improvements in Bicycle-Gearing, of which the following is a full and exact description, reference being had to the accompanying drawing, making part of this specification.

My invention relates particularly to that class of bicycles known as "chainless" or "gear" machines, and particularly to that class wherein differential gears are employed to impart different speeds to the machine at the will of the rider.

My invention consists in the combination, with the pedal-shaft, of gears of unequal diameter mounted thereon to revolve therewith, gear of unequal diameter mounted on the transmitting-shaft, and means for throwing either set of gears into or out of action with the other, and to certain novel features in the construction and arrangement of parts, all as hereinafter described.

The accompanying drawing represents a section of the rear portion of a bicycle-frame or the side tubes thereof and a portion of the driven wheel, showing the box or inclosing case for the gearing in section.

The tubular frame of the machine is mounted on the ordinary form of wheels provided with the usual form of seat, steering-fork, and handles.

The frame A, to which the seat-support is connected at its base and to which the lower side tubes B extend, is made in hollow or box form to provide an inclosing case for the gears hereinafter referred to, and in which frame or casing A are formed or attached the bearings for the pedal-shaft C, which bearings may be constructed in any usual or desired form.

The pedal-shaft has mounted on it two gears D D' of unequal diameter, in the present instance the one, D, being a bevel-gear and the other, D', a spur-gear. These gears are shown in the present instance as being rigidly connected together and provided with elongated hubs $d\ d'$, one of which hubs, $d'$, being grooved to receive a split collar $d^2$, to which the shifting-gear hereinafter described is connected.

The pedal-shaft is provided with a spline $d^3$, and the hub is provided with a key-seat of the usual or any desired construction, which while keying the gears to the shaft and causing the same to revolve therewith permits said gears to be shifted thereon.

Mounted in one of the side tubes B is the driving-shaft E, which shaft has mounted on one end thereof two gears F F' of unequal diameter to mesh with the gears D D', in the present instance the one, F, being a bevel-pinion and the other, F', consisting of a crown-gear.

The crown-gear F' is preferably formed integral with the pinion or hub and extends from the base thereof, with the teeth formed to engage those of the spur-gear D', by which construction and arrangement of parts it will be seen that when the gears D D' are shifted on the shaft or when the bevel-gear D is thrown into engagement with the pinion F an increased speed will be imparted to the machine, whereas when the spur-gear D' is shifted into engagement with the crown-gear F' a decrease of speed with corresponding increase of power will be imparted, the first named permitting the machine to be propelled at a high rate of speed in traveling over smooth or even ground, while the latter permits the climbing of hills or traveling over uneven or heavy roads without undue strain upon the rider.

Toggle-links G are mounted in the frame A or having one end of each thereof connected to said frame and the other ends connected to the collar $d^2$, the link in turn being connected through a rod $g$ with a rocking lever $g'$, pivotally mounted on the frame or other convenient point within reach of the rider, to permit the ready shifting of the gears as occasion shall require.

Having now described my invention, what I claim as new, and desire to secure by Letters Patent, is—

1. The combination in a bicycle-gear, a bevel-gear, a spur-gear formed integral therewith or rigidly connected thereto, mounted on the pedal-shaft to rotate therewith but adapted to move endwise relative thereto, a bevel-pinion and crown-gear mounted on the transmitting-shaft and rigidly connected thereto, and a shifting-lever engaging a hub on the bevel and spur gear for throwing said gears into or out of action with the pinion or crown-gear, substantially as described.

2. The combination in a bicycle-gear, a bevel and spur gear mounted on the pedal-shaft to rotate therewith but adapted to move endwise thereon a bevel-pinion mounted and fixed on the transmitting-shaft, an enlarged crown-gear, also mounted and fixed on said shaft and means for throwing either the bevel-gear into engagement with the pinion or the spur-gear into engagement with the crown-gear substantially as described whereby the speed may be changed or the power increased or diminished at will.

In testimony whereof I have hereunto set my hand this 7th day of August, A. D. 1894.

MARION L. NICHOLS.

Witnesses:
 CHAS. L. DU BOIS,
 ALEX. MAHON.